DIALING MECHANISM USING AN INDEPENDENTLY ROTATABLE SYNCHRONOUS MOTOR DRIVE

Filed Sept. 21, 1964

3 Sheets-Sheet 1

INVENTOR.
MANFRED R. KUEHNLE
BY
Weingarten, Orenbuch & Lahive
ATTORNEYS

INVENTOR.
MANFRED R. KUEHNLE
BY
Weingarten, Orenbuch & Lahive
ATTORNEYS

INVENTOR.
MANFRED R. KUEHNLE
BY
Weingarten, Orenbuch & Lahive
ATTORNEYS

United States Patent Office 3,336,446
Patented Aug. 15, 1967

3,336,446

DIALING MECHANISM USING AN INDEPENDENTLY ROTATABLE SYNCHRONOUS MOTOR DRIVE

Manfred R. Kuehnle, Lexington, Mass., assignor to Dasa Corporation, a corporation of California Filed Sept. 21, 1964, Ser. No. 398,021
19 Claims. (Cl. 179—90)

This invention relates in general to telephone mechanical pulse generating equipment and more particularly to a dial mechanism for producing accurately spaced pulse sequences.

Present day telephone receiver sets generally include a rotary dial mechanism which operates a set of pulsing contacts to produce a sequence of dial pulses on the telephone line. In the standard rotary dial mechanism the dialing wheel is kept in a home position by the action of a torsion spring which exerts a counterclockwise torque upon the dialing wheel and thus exerts a force which keeps the dialing wheel abutting a home mechanical stop. In order to generate dialing pulses the operator selects an appropriate finger hole and rotates this finger hole to a fixed finger stop position and then releases the wheel. The torsion spring then urges the wheel back to its fixed home position at a speed which is controlled by a centrifugal mechanical governor. The dialing pulse sequence is generated during the return movement of the dial wheel and the uniformity of the duration and spacing of the dialing pulses is determined by the uniformity of the rate of speed with which the dial wheel returns.

This dialing mechanism has, in the past, produced reasonably accurate results for most telephone situations. However, the action of the spring and the performance of the centrifugal friction governor vary somewhat after extended use, thus resulting in a variation of return speed of the dialing wheel and hence in a variation in the duration and spacing of the dialing pulses. With the complexities of multiple automatic switching, and the use of auxiliary equipment, such as automatic telephone dialers, the importance of precision pulse spacing and pulse duration increases and a precision not attainable with the standard dialing mechanism is required in order that this equipment operate satisfactorily. Various attempts have been made to modify the standard dialing mechanism in order to improve the uniformity of pulse spacing and duration. One approach to this problem has been the employment of a synchronous motor to aid the governor mechanism in controlling the return speed of the dialing wheel and hence control the uniformity of the pulses. Problems have, however, been encountered in making modifications of this nature to the dialing mechanism, since generally the maximum torque of the synchronous motors employed has been only sufficiently high to remove the peak fluctuations in the speed of the wheel when operated with a governor. If the motor is then connected operatively to the dialing wheel in both the windup as well as the return position, an excessive amount of torque from the viewpoint of convenience of dialing is present. However, the use of a one-way clutch such that the motor only drives the dial wheel in its return motion adds further complexity and size to the dialing mechanism. These modifications have then required a high torque motor as well as a somewhat involved mechanical arrangement to produce a one-way drive.

It is, therefore, a primary object of the present invention to provide a dialing mechanism for producing a pulse sequence of constant pulse spacing and pulse duration.

It is another object of the present invention to provide a telephone dialing mechanism for producing pulse sequences of uniform spacing and pulse duration wherein the uniformity is not dependent upon a uniform return speed of the dialing wheel.

It is still another object of the present invention to provide a telephone dialing mechanism for producing a pulse sequence of uniform spacing and pulse duration in which the torque against which the dial wheel is wound is substantially the torque of the torsion spring.

Although in one embodiment the dialing mechanism of the present invention employs most of the parts of a standard dialing mechanism, it represents, however, a fundamental departure in terms of its function. In contrast to other dials, the pulse sequence is generated exclusively by a motor driven cam arrangement while the rest of the mechanism is decoupled. The motor is a low torque synchronous motor and it is not required to either drive the dial wheel back to its home position or to override the torque of the torsion spring. In the device of this invention, operation of the dial wheel sets the amount of pulses to be generated, however, the dial wheel return force is generated by the torsion spring and controlled by the governor while the pulse sequence timing is controlled only by the motor. The mechanism also includes an anti-override feature to pervent the generation of excess pulses.

In a second embodiment, suitable for use with a push button dialer, depression of the selected push button sets the number of pulses and the pulse sequence timing is again controlled only by the motor.

The invention will now be described more fully with reference to the accompanying drawing in which.

Figure 1:
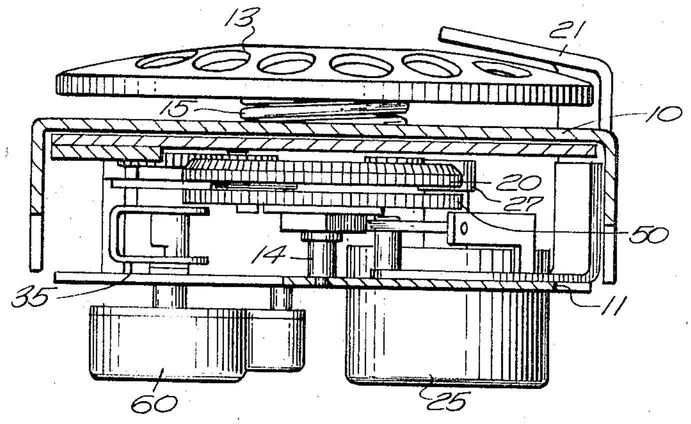
FIG. 1 is a side elevation view of one embodiment of a dial mechanism in accordance with the principles of this invention.
Figure 2:
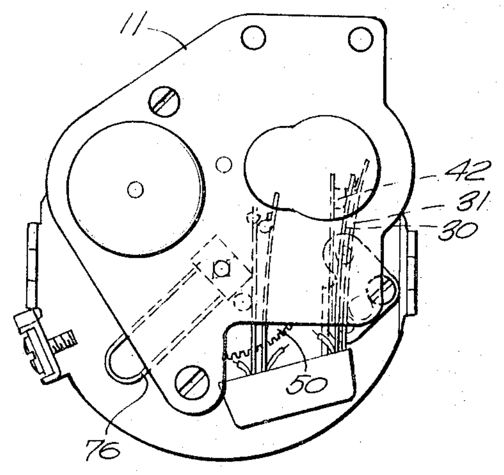
FIG. 2 is a plan view from the underside of the dial mechanism of FIG. 1.

With reference now to FIGS. 1 and 2, a front mounting plate 10 and a rear mounting plate 11 are supported in parallel spaced relation by a series of mounting studs 12. A dial wheel 13 is fixed to and supported by a shaft 14 which is rotatably mounted in the frame formed of the front plate 10 and the back plate 11. A torsion spring 15 exerts a counterclockwise force on the dial wheel 13 and maintains it fixed in a home position against a home mechanical stop (not shown). In the space between the front plate 10 and the rear plate 11, there is fixed to the shaft 14 a main drive gear 20 which, therefore, rotates whenever the dial wheel 13 is rotated. A finger stop 21 is mounted in a fixed position on the front plate 10 and extends above the dial wheel 13 such that when the dial wheel is rotated the end of the clockwise travel occurs when the operator's finger comes in contact with this finger stop. A mechanical governor element 25 is mounted on the bottom plate 11 and has extending from it a spindle 26 on which is mounted a small gear 27. The gear 27 is positioned to engage the main gear 20 and is driven by it. The dialing mechanism which has thus far been described, is substantially that of the unmodified standard telephone dialing mechanism, although the arrangement for generating the pulses from the rotation of the dial wheel has not yet been described.

In operation, the dial wheel 13 is rotated in a clockwise direction from its home position until the edge of the selected finger hole is aligned with the edge of the finger stop 21. The rotational motion in the clockwise direction is opposed by the force exerted by the torsion spring 15. When the operator releases the dial wheel 13 the torsion spring 15 drives it in the counterclockwise direction, however, the speed is modified by the action of the governor element 25 coupled to the dial wheel through the small gear 27 and the main drive gear 20. The governor element 25 is usually a simple mechanical governor of the centrifugal frictional type.

Figures 4, 5:
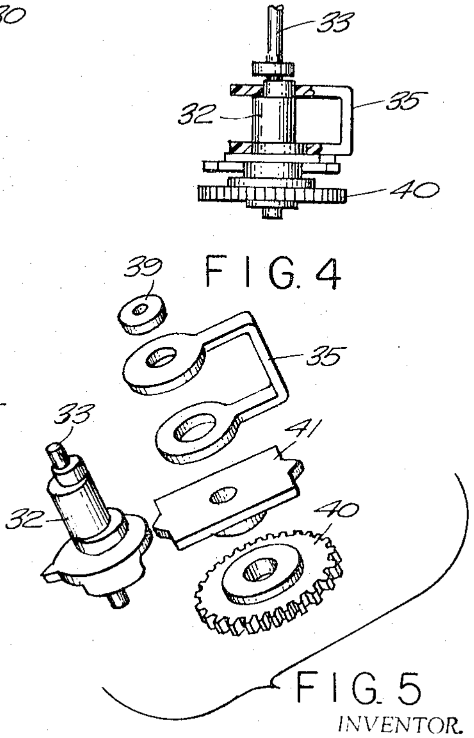
FIG. 4 is a detail view of the pulse cam sub-assembly employed in the dial mechanism of FIG. 1.
FIG. 5 is an exploded view of the pulse cam subassembly illustrated in FIG. 4.

The sequence of dial pulses are produced by a pair of electrical controls which are operated in intermittent fashion by a cam arrangement. The pulse cam sub-assembly and the arrangement of the contacts which it operates will next be described, since the specific sub-assembly is substantially identical for both the standard version of the dial mechanism and for this embodiment of the dialer of the present invention. The electrical dialing pulses are generated by the making and breaking of a pair of electrical contacts which consist of a pair of extended leafs 30 and 31. (These contacts have been omitted from FIG. 1 in order to provide a clearer view of the mechanism.) The electrical making and breaking of this pair of contacts is controlled by the clockwise rotation of a cam and yoke sub-assembly illustrated in detail in FIGS. 4 and 5. This sub-assembly includes a spindle 33 which is formed with an eccentric cam portion 32 on wihch is mounted a yoke 35 formed of an electrically insulating material such as polyethylene or Teflon. The yoke 35 is mounted on the cam 32 in such a fashion that rotation of the cam in either the clockwise or counterclockwise direction tends to rotate the yoke 35 in the same direction, however, when mechanical resistance is imposed against further rotation of the yoke 35 the cam continues to rotate without the yoke rotating. The yoke 35 is held in place on the spindle and cam arrangement by virtue of a retaining ring 39 and a second retaining element 41, both elements being press fitted onto the spindle 33. At one end of the spindle 33 a cam gear 40 is also fixed.

The operation of this cam-yoke arrangement for providing the intermittent make-break of the electrical contacts is as follows:

One of the leaf contacts 30 has mounted on it an L-shaped arm 42 which rides upon the surface of cam 32. As the spindle 33 and hence the cam 32 rotates, the arm 42 moves in and out in a reciprocal motion due to the eccentricity of the cam. When the cam is rotating in the clockwise direction, the yoke 35 slips between the leaves 30 and 31 of the electrical switch maintaining the leaf contact 31 at a fixed distance from the axis of spindle 33. The reciprocal motion then of the leaf 30 makes an intermittent make and break in the electrical contact with the contact being made and broken once for each complete rotation of the cam 32. On the other hand, if the spindle 33 is rotated in the counterclockwise direction, the yoke 35 is rotated away from its position against the leaf contact arm 31. Under these circumstances, although the contact leaf 30 continues to move in and out reciprocally as the cam is rotated, the second leaf 31 also moves in and out, thus maintaining a closed contact. In a conventional dialing mechanism the cam gear 40 is meshed with an idler gear which is, in turn, meshed with the main shaft gear and hence the spindle 33 rotates when the dial wheel 13 is rotated. The gearing ratio between the main shaft gear 20 and the cam gear 40, is of course, arranged such that for the maximum rotation of the dial wheel 13 the cam 32 makes ten revolutions thus producing ten intermittent spaced pulses. It is apparent that the uniformity of speed with which the dial wheel 13 returns to its home position controls the uniformity of spacing and duration of the pulses formed by the intermittent making and breaking of contacts 30 and 31.

In the standard dial mechanism a second switch having a pair of contacts is actuated by a small stud on the shaft gear 20 which is positioned such that switch is closed before the dial wheel returns fully to its home position and the closing of the second switch prevents any further pulses from being created on the outgoing telephone line.

Figure 3:
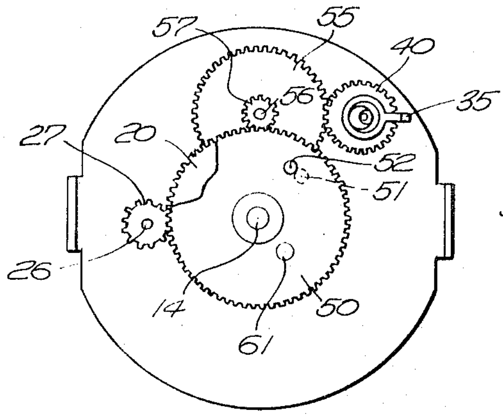
FIG. 3 is a transverse cross-sectional view taken along the line 3—3 of FIG. 1.

Turning now to the improvement in the standard dial mechanism which is the essence of applicant's invention, it will be noted that in the mechanism as shown in the drawing the cam sub-assembly is not driven by the main shaft gear 20. In this illustrated embodiment of applicant's invention, a second shaft gear 50 is loosely mounted on the shaft 14, and is free to rotate with respect to shaft 14. On the surface of the gear 50 which faces the gear 20 is mounted a small protruding stud 51 and a like stud 52 is mounted on the face of gear 20 which is in juxtaposition to the stud 51. Rotation then of the dial wheel 13 in a clockwise direction away from its home position causes the second shaft gear 50 to rotate since the studs 52 and 51 engage one another; however, the return motion of the dial wheel 13 to its home position does not rotate shaft gear 50. As is most clearly seen in FIG. 3, an idler gear 55 is mounted on a spindle 56 and also mounted on spindle 56 is a smaller gear 57. The small gear 57 engages and meshes with the second shaft gear 50 in such a way that rotation of the shaft gear 50 drives the spindle 56. The idler gear 55 is then also driven and this idler gear 55 is meshed to drive the cam gear 40. The spindle 33 of the cam sub-assembly is driven by the output shaft of a low torque, low inertia synchronous motor 60. Typically, this motor might be a hysteresis-type motor having a shaft output speed of 600 r.p.m. Power would be supplied to this motor 60 by the opening of switch 45 actuated by a stud element 61 on the underside of gear 50 whenever the dial wheel 13 is moved away from its home position. The switch 45 also serves the function of the second switch in the standard dialing mechanism.

In the operation of the above-defined system rotation of the dial wheel 13 in a clockwise direction rotates the second shaft gear 50 in a clockwise direction and hence through gears 56 and 55 also rotates the cam gear 40 and the shaft of motor 60. Because of the low torque of the hysteresis motor 60 the additional force against rotation of the dial wheel beyond that of the torsion spring is negligible. When the dial wheel 13 is released, the wheel 13 returns to its home position by virtue of the action of the torsion spring 15 at a speed controlled by the governor 25. On the other hand, the cam gear 40 is not driven back at this same speed since the shaft gear 50 which is coupled to cam gear 40 is not driven in the counterclockwise direction with rotation of the dial wheel 13. Rather, the synchronous motor 60 drives the spindle 33 and hence the cam 32 in the counterclockwise direction at a speed which is completely a function of the motor 60. Under these circumstances the speed of revolution and hence the spacing of the pulses is kept constant. The motor 60 then drives, through the idler gear 55 and the small gear 56, the second shaft gear 50 back toward its home position until stud 52 is once again in engagement with stud 51. The stud 61 on gear 50, will, once again, in the return travel of the gear 50 close the contacts of switch 45 thereby removing power from synchronous motor 60 as well as preventing any further pulses from being transmitted out on the telephone lines.

Figure 6:
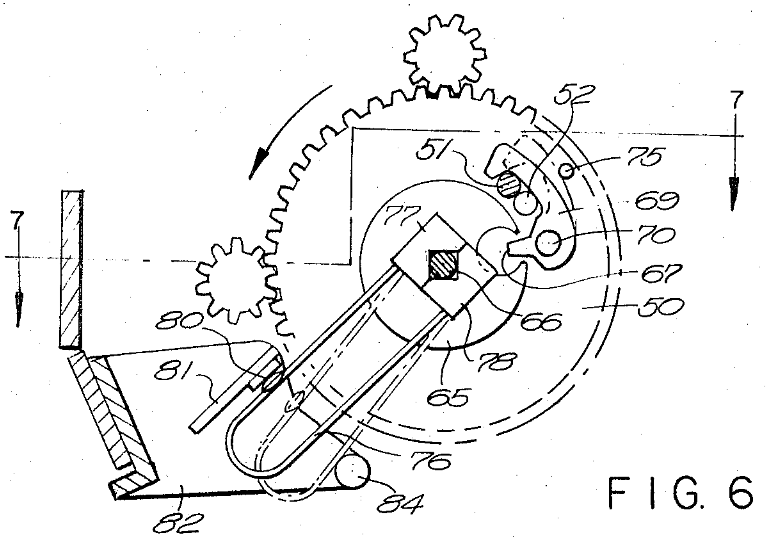
FIG. 6 is an enlargement of a portion of the view of FIG. 3.
Figure 7:
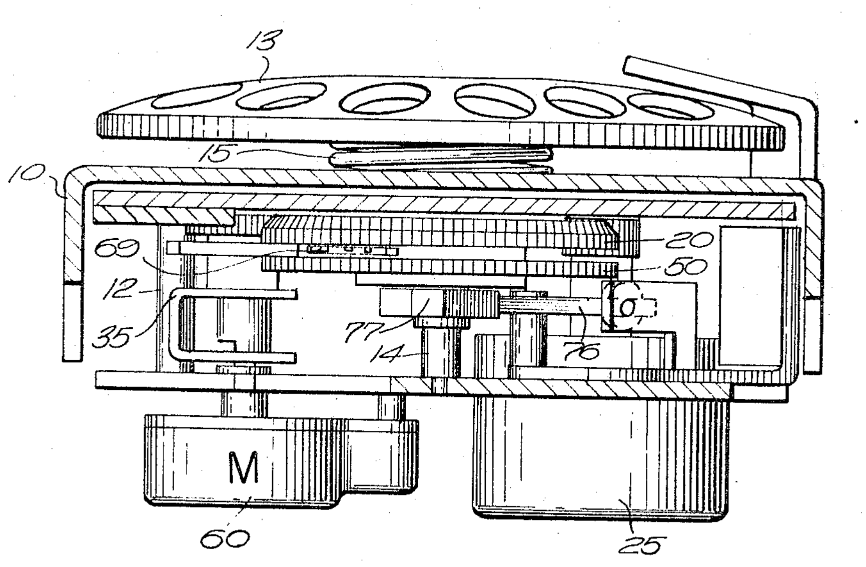
FIG. 7 is a vertical cross-sectional view taken along the line 7—7 of FIG. 6.

One problem in operation of a dialer of this type arises from possible override of the loose cam gear 50 in the dial windup operation with resultant extra pulses generated on the return motion. A vigorous rotation in the clockwise rotation would be apt to drive the loose shaft gear 50 to continue turning somewhat after the fixed shaft gear 20 has stopped. The invention shown and described herein includes, however, one anti-override mechanism, which is shown most clearly in FIGS. 6 and 7.

The override mechanism includes a disc-shaped cam 65 having an extending stem portion 66. The cam 65 is mounted loosely on shaft 14 with the disc portion contacting the lower side of the fixed shaft gear 20 and the stem extending downward through and below the loose shaft gear 50. The cam 65 has a small circular cutout 67 at one edge. A latch member 69 is attached to fixed shaft gear 20 through a pivot 70 near the periphery of the cam 65. The latch member 69 has a pawl tip 72 which extends into the circular cutout 67. The remainder of the latch member 69 is formed in a general hook shape, which in one position latches the pins 51 and 52 together. Also mounted on fixed shaft gear 20 is a limit pin 75 which prevents the latch 69 from pivoting out beyond the periphery of gear 20. Mounted on the stem portion 66 of the cam 65 is an electrical switch arm 76. The arm 76 is fixed to a pair of friction blocks 77 and 78 which will rotate with the stem 66 causing the switch arm 76 also to rotate, but these blocks 77 and 78 are fitted to the stem 66 such that it rotates within them whenever the switch arm 76 meets any resistance. Typically, the friction blocks 77 and 78 may be formed of polystyrene.

The motion of arm 76 is interrupted in one direction of rotation by a switch contact 80 mounted on a vertically extending portion 81 or an insulating block 82, which is in turn mounted to the finger stop 21. The motion of arm 76 in the opposite direction is interrupted by a second vertically extending portion 84 of the same insulating block. The switch arm is arranged so that rotation of the finger wheel 13 in the clockwise direction rotates the switch arm until it is resting against the extension 84, while on release of the finger wheel the arm 76 rotates back until it again abuts contact 80. When the finger wheel 13 is wound up the cam 65 and cam 76 are carried with it until the arm 76 strikes the projection 84, which then by the frictional drag of blocks 77 and 78 on stem 66, causes the cam 65 to stop rotating momentarily. This results in the cam pressure on pawl 67 acting to keep the latch member 69 latching pins 51 and 52 together. Further rotation of the finger wheel 13 cause the cam 65 to continue rotating with gear 20, however, the frictional drag maintains the latch 69 in this same position.

When the finger wheel wind up is stopped the loose cam 50 cannot override because it remains latched to the fixed gear 20. Upon release of the finger wheel, the arm 76 and cam 65, as well as the gears 20 and 50 rotate in the opposite direction until arm 76 strikes contact 80. Once again, the frictional drag of blocks 77 and 78 cause the cam 65 to rotate with respect to fixed gear 20, but this time in the opposite direction. The pressure of cam 65 on pawl tip 67 now pivots the latch arm 69 outward releasing the loose gear 50 and allowing it to rotate back to its home position independently of fixed gear 20.

The travel of arm 76 is such that on the return motion the arm makes an electrical connection at control 80 before any pulses from switch contacts 31 and 30 are produced. The connection to control 80 may then be used to start auxiliary equipment operating in time to respond to these dial pulses. If no such switching operation is desired arm 76 may be a purely mechanical element and contact 80 may be replaced with a mechanical stop.

From the above description, it is apparent that in applicant's mechanism a very light-weight low inertia motor 60 may be utilized to create the constant speed for generating a precision train of pulses since only the cam and three gears need to be driven by it, with the torsion spring loaded dial wheel returning entirely independently to its home position. One limitation on the relative return speeds between the second shaft gear 50 and the dial wheel 13 is that the dial wheel must have already returned to its home position before the shaft gear 50 completes its return in order that the stud 51 on gear 20 should not interfere with the return speed of gear 50 and hence with the accuracy of the pulse train being generated.

Figure 8:
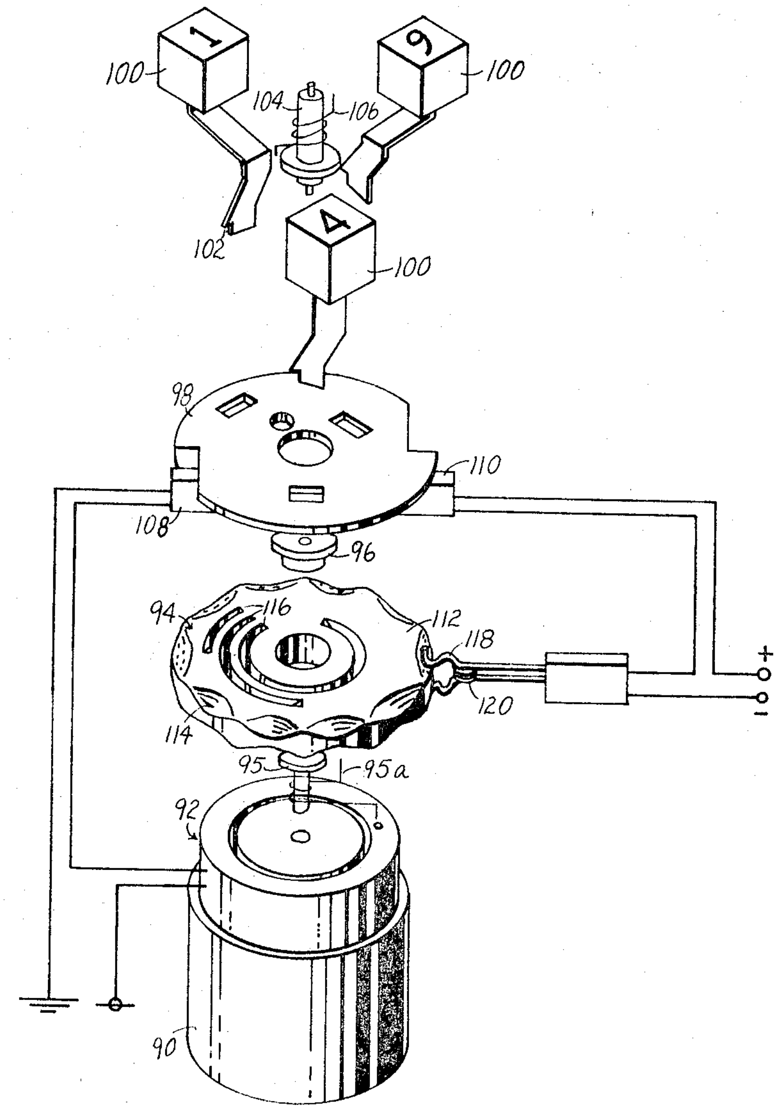
FIG. 8 is an exploded view of a second embodiment of a dial mechanism in accordance with the principles of this invention.

Referring now to FIG. 8, it should be first noted that the figure has been greatly simplified to better illustrate the principles of operation of the alternative embodiment of this invention. For example, the housing for the illustrated mechanism has not been shown nor have the various switches been shown in any detail. Thus, the figure shows a synchronous motor 90 energized by an appropriate source of alternating current (not shown) so as to drive a magnetic clutch 92. A contactor wheel 94 (described in more detail hereinafter) is affixed, as by a shaft 95 projecting from its bottom surface to fit into the opening (not numbered) on the upper side of the magnetic clutch 92.

A helical spring 95*a* is fitted over the shaft 95 and captured in holes (not numbered) formed in the contactor wheel 94 and the housing of the magnetic clutch 92. Thus, when the latter is not energized, the contactor wheel 94 is held in an initial, or "home" position.

A bushing 96, pressed into the central opening in the contactor wheel 94, in turn supports a matrix plate 98 through which the bottom portion of a number of pushbuttons 100 are led, the cut-out portion 102 of each such bottom portion normally resting on the top of the matrix plate 98. The support for the matrix plate 98 is completed by a shaft 104 appropriately shaped, as shown, to fit in an opening (not numbered) in the bushing 96 and a bearing (not shown) in the housing. A helical spring 106 fitted around the shaft 104, one end of such spring being captured in a hole (not numbered) in the matrix plate 98 and the other end captured in an opening in the housing, completes the mechanical support for the matrix plate 98. It may be seen from the foregoing that, when the magnetic clutch 94 is not energized, matrix plate 98 is, as was the contactor wheel 94, brought to an initial, or "home" position.

A pair of microswitches 108, 110 are arranged so as to be open when the matrix plate 98 is in its home position. Microswitch 108 is, as shown, serially connected to the magnetic clutch 92 and a source of energizing current therefor. Consequently, even though the synchronous motor 90 may be energized, its rotary motion is not coupled to the contactor wheel 94. When, however, any one of the pushbuttons 100 is depressed, the inclined back surface of its depending portion forces the matrix plate 98 to rotate against the restraining force of the helical spring 106. Such rotation causes both microswitches 108, 110 to close with the result that the magnetic clutch 92 is energized so that the rotary motion of the synchronous motor 90 is coupled to the contactor wheel 94.

The contractor wheel 94 comprises a disc-like member 112 of an electrical insulating material. The peripheral portion of such member is scalloped as shown, there being as many scallops 114 as the maximum number of pulses to be generated. The upper surface of the disc-like member 112 is formed to define concentric grooves 116. The number and length of each of the concentric grooves 116 is dependent on the number of pushbuttons 100. In passing, it should be noted that the pushbuttons 100 are each formed so that the bottom of each is above one of the grooves 116. A spring clip 118, supporting a pair of opposing contacts 120, encompasses the scallops 114 on the disc-like member 112. Thus it may be seen that, so long as the microswitch 110 is closed, rotation of the contactor wheel 94 is effective to make and break the circuit at the terminals marked "+" and "−" in the figure. The interval between make and break is determined by the speed of the synchronous motor 90 and the dimensions of the scallops 114. Obviously, the scallops 114 are similar to each other if evenly spaced pulses are to be attained.

The length of the pulse train produced depends upon which of the pushbuttons 100 is depressed. Assuming the apparatus is in its home position and that the pushbutton marked "4" is depressed, then the bottom of that pushbutton engages in the right-hand end of the center groove in the disc-like member 112, the matrix plate is rotated in a counterclockwise direction and the spring clip 118 is opened and closed. When the disc-like member 112 rotates counterclockwise until the bottom of the selected pushbutton reaches the end of the groove 116, the pushbutton is moved back to its rest position and the matrix plate 98, under the influence of helical spring 106 snaps back to its home position. This movement, in turn, opens microswitches 108, 110, thus decoupling the contractor wheel 94 (which returns to its home position under the influence of helical spring 95*a*) and opening the circuit of the contacts 120.

Having described the invention, various modifications and improvements will now occur to those skilled in the art and the invention described herein should be construed as limited only by the spirit and scope of the appended claims.

What is claimed is:

1. A dialing mechanism for producing a number of precisely spaced electrical pulses comprising: mechanical means for preselecting the number of pulses to be generated; rotatable means for generating said electrical pulses; a motor for driving said rotatable means in one direction only; means operative after said preselection of the number of pulses for allowing said rotatable means to rotate in said one direction, the amount of said rotation being mechanically limited by said preselecting means and the speed of rotation of said rotatable means being determined only by the speed of said motor.

2. In a dialing mechanism including a dialing wheel having a home position, restoring means acting to maintain said dial wheel in said home position; and wherein the amount of rotation of said dialing wheel away from said home position selects the number of pulses to be generated, the improved combination comprising, rotatable means for generating electrical pulses, a motor for driving said rotatable means in one direction only, means operative upon release of said dial wheel after said dial wheel has been rotated away from said home position for allowing said rotatable means to rotate in said one direction independent of the return motion of said dial wheel, only until said dial wheel has returned to said home position.

3. In a dialing mechanism including a dial wheel having a home position, a dial shaft connected to and rotated by the said dial wheel, means furnishing a restoring torque acting to maintain the said dial wheel in its home position, a first shaft gear mounted on and fixed to said dial shaft for rotation with said dial shaft, a set of electrical contacts, and rotatable means operably associated with said electrical contacts for making and breaking an electrical connection between said contacts once for each complete revolution of said rotatable means, the improvement comprising a synchronous motor coupled to said rotatable means for rotating said rotatable means in at least one direction independent of any rotation of said dialing wheel; and means mechanically associated with said rotatable means for limiting the number of revolutions of said rotatable means to a number determined by the amount said dial wheel is rotated away from its home position.

4. Apparatus in accordance with claim 3 wherein said motor is energized only upon motion of said dial wheel away from said home position.

5. Apparatus in accordance with claim 3 wherein said means for limiting the number of revolutions comprises a second shaft gear mounted on said dial shaft, said second shaft gear being free to rotate independently of rotation of said dial shaft; a first stud mounted on the surface of said first shaft gear facing said second shaft gear, and a second stud mounted on the surface of said second shaft gear facing said first shaft gear, said studs being positioned to engage one another such that upon rotation of said dial wheel away from said home position said second shaft gear rotates with said first shaft gear while upon return of said dial wheel to said home position said first shaft gear returns to its initial position independently of said second shaft gear; and auxiliary means operatively coupling said second shaft gear to said rotatable means whereby rotation of said rotatable means drives said second shaft gear.

6. Apparatus in accordance with claim 5 and further including a latch member pivotally mounted on said first shaft gear, and actuating means for actuating said latch member to latch together said first and second studs during rotation of said dial wheel away from said home position and to disengage said latch member during the return motion of said dial wheel.

7. Apparatus in accordance with claim 5 wherein the return speed of said dial wheel is faster than the rotation of said second shaft gear when driven by said motor in the same direction as the return motion of said dial wheel.

8. In a dialing mechanism including a dial wheel having a home position, a dial shaft connected to and rotated by the said dial wheel, a torsion spring positioned to furnish a torque acting to maintain the said dial wheel in its home position, a first shaft gear mounted on and fixed to said dial shaft for rotation with said dial shaft, a set of electrical contacts, and rotatable means operably associated with said electrical contacts for making and breaking an electrical connection between said contacts once for each complete revolution of said rotatable means, the improvement comprising a synchronous motor coupled to said rotatable means for rotating said rotatable means in a counterclockwise direction; and means mechanically associated with said rotatable means for limiting the number of revolutions of said rotatable means to a number determined by the amount said dial wheel is rotated away from its home position in a clockwise direction.

9. In a dialing mechanism including a dial wheel having a home position, means furnishing a restoring torque acting to maintain said dial wheel in said home position, and wherein the dial wheel is rotated a selected amount away from said home position in a first direction to select the number of pulses to be generated by said mechanism, the improved combination comprising: rotatable means for producing electrical pulses, the number of said pulses so produced being determined by the number of revolutions of said rotatable means; a motor coupled to said rotatable means for rotation thereof independent of rotation of said dial wheel, and means actuated by rotation of said dial wheel in said first direction for setting a limit to the number of revolutions of said rotatable means.

10. Apparatus in accordance with claim 9 wherein said motor is a low torque synchronous alternating current motor.

11. In a dialing mechanism including a dial wheel having a home position, means furnishing a restoring torque acting to maintain said dial wheel in said home position, and wherein the dial wheel is rotated a selected amount away from said home position in a first direction to select the number of pulses to be generated by said mechanism, the improved combination comprising: rotatable means for producing electrical pulses, the number of said pulses so produced being determined by the number of revolutions of said rotatable means in a second direction, a motor coupled to said rotatable means for rotation thereof in said second direction independent of rotation of said dial wheel in said second direction, and means actuated by each rotation of said dial wheel in said first direction for setting a limit to the number of revolutions of said rotatable means in said second direction during return of said dial wheel to said home position.

12. Apparatus in accordance with claim 11 wherein said dial wheel is mounted on and fixed to rotate with a dial shaft and wherein said limit setting means comprises a first shaft gear fixed to rotate with said dial shaft, a first stud carried by said first shaft gear and protruding from one face thereof, a second shaft gear rotatably mounted on said dial shaft, gear means connecting said second shaft gear to said motor, a second stud mounted on the face of said second shaft gear facing said first shaft gear, said studs being positioned such that on rotation of said dial wheel in said first direction said first stud engages said second stud and thereby rotates said second shaft gear in conjunction with said first shaft gear, while upon rotation of said dial wheel in said second direction said studs are disengaged.

13. Apparatus in accordance with claim 12 including a latch means for latching said studs together only during rotation of said dial wheel in said first direction.

14. Apparatus in accordance with claim 13 wherein said latch means includes a latch arm pivotally mounted on the face of said first shaft gear from which said first stud protrudes, a cam member rotatably mounted on said dial shaft between said first and said second shaft gears, said cam member having a disc portion parallel to the plane of and adjacent to the faces of said shaft gears and a stem portion concentric with said dial shaft and extending through said second shaft gear, said cam member including a cut-out cam surface in said disc portion, said latch arm having a pawl tip engaging said cam surface, and cam actuator means mounted on said cam stem portion for rotating said cam member in one direction relative to said first gear upon rotation of said dial wheel in said first direction causing said pawl tip to rotate said latch arm to lock said first and second studs together and for rotating said cam member in the opposite direction relative to said first gear upon the return motion of said dial wheel causing said pawl tip to rotate said latch arm to release said first and second studs from one another.

15. A dialing mechanism for producing a number of precisely spaced electrical pulses comprising: a disc member having a home position; a motor for driving said disc member in a first direction only away from said home position; a pulse generator operatively associated with said disc for generating electrical pulses, the number of said pulses being determined by the amount of rotation of said disc and the spacing of said pulses being determined by the speed of rotation of said disc, selection means for selecting the number of pulses to be generated, said selection means being mechanically arranged upon actuation to engage said disc member and thereby limit the amount of rotation in said first direction.

16. A dialing mechanism for producing a number of precisely spaced electrical pulses comprising: a disc member having a home position, said disc member having a number of indentations spaced around its periphery; a pair of electrical contacts operatively associated with said disc member for producing a contact closure for each indentation which engages said contacts while said disc is rotating in a first direction; a motor for driving said disc member only in a first direction away from said home position; a plurality of pushbuttons for selecting the number of pulses to be generated; said pushbuttons, when actuated, engaging said disc member to limit the amount of rotation of said disc in said first direction.

17. Apparatus in accordance with claim 16 and including clutch means coupling said motor to said disc member; said clutch means engaging only upon actuation of one of said pushbuttons.

18. Apparatus in accordance with claim 17 and further including spring biasing means for returning said disc member to said home position after said limit of rotation has been reached.

19. Apparatus for generating a series of precisely spaced electrical pulses comprising: a plurality of pushbuttons each having a depending portion; a disc element having a home position; a motor; coupling means connecting said motor to said disc, said disc having a plurality of indentations disposed around the periphery thereof; a pair of electrical contact elements engaging the periphery of said disc such that, upon rotation of said disc, said electrical contacts are closed once for each of said indentations, said disc having a plurality of concentrically disposed grooves of varying lengths inscribed on one surface thereof, said grooves being disposed with relation to said pushbuttons such that upon depression of a pushbutton its depending portion extends into only one of said grooves; means operative upon depression of any one of said pushbuttons for causing said motor to rotate said disc away from its home position until the said depending portion of the depressed pushbutton engages the end of the respective groove, and return means for thereafter returning said disc to said home position.

References Cited

UNITED STATES PATENTS 2,588,397 3/1952 Lovell et al. -------- 179—90.2
3,244,817 4/1966 Lockwood et al. ------ 179—90

KATHLEEN H. CLAFFY, *Primary Examiner.*

A. H. GESS, *Assistant Examiner.*